(12) United States Patent
Korn (10) Patent No.: US 9,727,555 B2
(45) Date of Patent: Aug. 8, 2017

(54) WRITTEN WORD REFINEMENT SYSTEM AND METHOD

(71) Applicant: Zamir Korn, Huntington, NY (US)

(72) Inventor: Zamir Korn, Huntington, NY (US)

(73) Assignee: Truthful Speaking, Inc., Huntington, NY (US)

( * ) Notice: Subject to any disclaimer, the term of this patent is extended or adjusted under 35 U.S.C. 154(b) by 0 days.

(21) Appl. No.: 15/246,162

(22) Filed: Aug. 24, 2016

(65) Prior Publication Data

US 2016/0364380 A1 Dec. 15, 2016

Related U.S. Application Data

(63) Continuation of application No. 14/553,338, filed on Nov. 25, 2014, now Pat. No. 9,436,676.

(51) Int. Cl.
| | |
|---|---|
| G06F 17/24 | (2006.01) |
| G10L 13/08 | (2013.01) |
| G09B 5/06 | (2006.01) |
| G06F 17/27 | (2006.01) |
| G09B 19/00 | (2006.01) |

(52) U.S. Cl.
CPC .......... *G06F 17/2785* (2013.01); *G06F 17/24* (2013.01); *G06F 17/274* (2013.01); *G09B 19/00* (2013.01); *G10L 13/08* (2013.01); *G09B 5/06* (2013.01)

(58) Field of Classification Search
CPC ...... G06F 17/274; G06F 17/2785; G09B 5/06
See application file for complete search history.

(56) References Cited

U.S. PATENT DOCUMENTS

| | | | | | |
|---|---|---|---|---|---|
| 5,170,349 | A | * | 12/1992 | Yagisawa ............... | G06F 17/274 704/9 |
| 5,311,429 | A | * | 5/1994 | Tominaga ............. | G06F 17/274 704/10 |
| 5,692,906 | A | * | 12/1997 | Corder ................. | G06Q 20/042 434/118 |
| 5,694,523 | A | * | 12/1997 | Wical .................... | G06F 17/274 706/45 |
| 5,819,248 | A | * | 10/1998 | Kegan ................... | G06F 17/274 706/45 |
| 7,424,420 | B2 | * | 9/2008 | Polanyi ................. | G06F 17/274 704/8 |

(Continued)

*Primary Examiner* — Brian Albertalli
(74) *Attorney, Agent, or Firm* — Alfred M. Walker; John F. Vodopia (57) ABSTRACT

A method for processing an original user writing, implemented by a computer processor, to modify relationships between words, phrases, signs and symbols comprising the writing, where necessary, to generate a modified writing that more clearly conveys a semantic content intended by the user, or consistent with the core principles associated with its mechanisms, when compared to the original user writing. The method includes receiving an original writing from a user, processing to perform a linguistic analysis on the original user writing in accordance with a plurality of rules to identify semantic content and based on the processing, and the semantic content, altering the relationships between the words, phrases, signs and symbols within the writing, where necessary, to realize a modified writing reflecting the altered relations.

14 Claims, 3 Drawing Sheets

(56) References Cited

U.S. PATENT DOCUMENTS

| | | | | |
|---|---|---|---|---|
| 8,014,996 B1* | 9/2011 | Kinder | ............... | G06F 17/274 |
| | | | | 704/1 |
| 2006/0123329 A1* | 6/2006 | Steen | ............... | G06F 17/248 |
| | | | | 715/270 |
| 2007/0143310 A1* | 6/2007 | Vigen | ............... | G06F 17/274 |
| 2009/0119095 A1* | 5/2009 | Beggelman | ......... | G06F 17/2785 |
| | | | | 704/9 |
| 2009/0248399 A1* | 10/2009 | Au | ............... | G06F 17/27 |
| | | | | 704/9 |
| 2010/0257182 A1* | 10/2010 | Saliba | ............... | G06F 17/274 |
| | | | | 707/747 |
| 2011/0010163 A1* | 1/2011 | Jansen | ............... | G06F 17/271 |
| | | | | 704/9 |
| 2011/0270603 A1* | 11/2011 | Ovil | ............... | G06F 17/2705 |
| | | | | 704/9 |
| 2011/0313757 A1* | 12/2011 | Hoover | ............... | G06F 17/274 |
| | | | | 704/9 |
| 2012/0089387 A1* | 4/2012 | Gamon | ............... | G06F 17/274 |
| | | | | 704/9 |
| 2012/0251016 A1* | 10/2012 | Lyons | ............... | G10L 13/08 |
| | | | | 382/276 |
| 2012/0290299 A1* | 11/2012 | Basson | ............... | G10L 15/063 |
| | | | | 704/235 |
| 2013/0046531 A1* | 2/2013 | Chandramouli | .... | G06F 17/2785 |
| | | | | 704/9 |
| 2013/0253910 A1* | 9/2013 | Turner | ............... | G06F 17/274 |
| | | | | 704/9 |
| 2015/0104764 A1* | 4/2015 | Murray | ............... | G06F 3/0481 |
| | | | | 434/169 |

* cited by examiner

WRITTEN WORD REFINEMENT SYSTEM AND METHOD

RELATED APPLICATIONS

This application is a continuation of application Ser. No. 14/553,338, filed Nov. 25, 2014, and claims priority under 35 U.S.C. §120. The '338 application is incorporated by reference herein.

BACKGROUND OF THE INVENTION

The invention is related to communications that accurately and truthfully convey the underlying semantic intent that a user intends to communicate, by modifying an original user writing, where necessary, and providing the user with the reasoning behind the changes so that he/she may realize not only a corrected writing but be exposed to the rules that realize the modified writing.

As is known, there written communications are readily misunderstood because language and communication styles are always influenced by a writer's background, i.e., the writer's geographical original, education, social background, work experience and life experiences in general, without limitation. For that matter, the shorter the writing, for example, a text message as distinguished from a graduate school paper or other scholarly article, the more likely it can be misunderstood by readers. For that matter, many writers, regardless of their educational background are just unawares of the colloquialisms they might use, their regional expressions and even the inherent erroneous grammatical practices that can lead to writings that fail to communicate their true semantic intent. In addition, societies, through language styles, distort objective aspects of reality and replace them with modes of expression that interfere with day to day functioning in communication and goal directed action.

SUMMARY OF THE INVENTION

The present invention overcomes the shortcomings of known arts, such as those mentioned above.

The invention called Truthful Speaking, relates to a computer-based method of processing writings or text-based communications and based on the processing, making alterations, substantially minor, in the writings or text-based communications to enhance the "truthfulness" or definiteness of the words in order to literally convey the exact context to be communicated. The method, which operates a number of mechanisms (for example, ten mechanisms), is a software system or application program embodying computer readable instructions ("software") that are processed by a user's computer within which the software is installed and operational to analyze the user's writing by use of his/her computer, whether it is in the form of email communications or in the form or word processing document, presentation, memo, etc., and modify certain parts of the written language. The invention also includes a computer system in which the inventive software method is operational and a non-transitory computer readable medium in which the instructions comprising the method are stored The mechanisms modify the written language using a plurality, for example, 20, word/phrase pools, which are stored. And while the modified language is advantageous, the inventive method also is advantageous in that user interaction with the software, e.g., viewing and recognizing the textual changes implemented by the software to his/her writing, effects a positive change in the user's writing and communication skills in the long term, i.e., enhances communication and empowers actions to those who choose to utilize and observe the method's effect on their written communications. The invention may very well effect particular changes to the user's writing and communication style (or lack thereof).

In greater detail, when users operate the inventive method in the background of the computerized writing tools, its use improves the user's ability to be more objective about what they are thinking and feeling, by observing the textual modifications, over time. In a sense, the invention exposes the users and preferably provides the users with a healthier perspective on their relationship to themselves and others and, the invention transcends barriers to accomplishing life's goals through the act of commitment. The inventive methods acts as a self-help tool for people to use on an ongoing basis for communicating with others and reflecting on their own experiences.

Once operational in a user's computer, the logistical task implemented by the inventive method is straightforward. A sentence is typed by the user and processed, where the processing causes a verbal output in the form of verbal instructions to the user associated with the typed data. The verbal instructions or output is a function of guidelines or rules embodying 10 specific mechanisms or rules, which operate in association with the word/phrase pools. In one embodiment, for example, the method relies upon 10 specific mechanisms or rules to modify the language being processed using 19 or 20 word/phrase pools, which supplement and diversify vocabulary.

The 10 mechanisms alter a user's language in a way that allows people to distance themselves from their thoughts and emotions, fully experience contradicting thoughts and feelings, question the causes of their decisions, experience living in the present moment and empower healthy actions by disempowering words, phrases, thoughts and feelings that interfere in keeping commitments and achieving goals.

Ideally, when people text for 20-30 minute sittings, feelings of increased awareness and thoughts of focused goal-directed action will emerge, based on the feedback provided by the inventive method.

In a configuration step, the user pre-programs how often in a texted conversation each mechanism is utilized. Most mechanisms have pools of alternate words that are substituted for the original element in a sentence. The user specifies how frequently these words are used, or may creatively type in their own variant. The above options allow the output to be natural and stylized for each individual, as opposed to being rigid, redundant, mechanistic and boring. Several mechanisms are employed simultaneously for a given sentence when appropriate.

In an embodiment, the invention includes a method for processing an original user writing, implemented by a computer processor, to modify relationships between words, phrases, signs and symbols comprising the writing, where necessary, to generate a modified writing that more clearly conveys a semantic content intended by the user when compared to the original user writing, or guided by the theoretical underpinnings of the 10 mechanisms outlined herein. The method includes steps of receiving an original writing from a user, processing to perform a linguistic analysis on the original user writing in accordance with a plurality of rules to identify semantic content, and, based on the processing, and the semantic content, altering the relationships between the words, phrases, signs and symbols within the writing, where necessary, to realize a modified writing reflecting the altered relations.

The step of altering the relationships includes generating a description highlighting a difference between a connotation of the altered words, phrases, signs and symbols altered before and after alteration. Preferably, generating the description includes communicating a semantic rule. The method can also include a step of communicating the modified writing to a receiver and preferably, communicating the reason for making the necessary changes made to the original user writing and included in the modified writing to a receiver. The step of processing can include implementing at least one of a plurality of mechanisms, wherein the plurality of mechanisms operate in reliance upon a plurality of word-phrase tools. Preferably, the plurality of mechanisms includes 10 mechanisms. In one form, the word-phrase tools operate to supplement and diversify vocabulary including in the modified writing. The method also includes a step of configuring the pre-programming the processing to define how often each mechanism is utilized is step of processing.

In another embodiment, the invention includes computer program product comprising program code means embodied in a non-transitory computer readable, which upon processing by a computer, executes a method for processing an original user writing to modify relationships between words, phrases, signs and symbols comprising the writing, where necessary, to generate a modified writing that more clearly conveys a semantic content intended by the user, or consistent with the philosophy of the 10 mechanisms, when compared to the original user writing, as described above.

In another embodiment, the invention includes a computer system programmed to process an original user writing to modify relationships between words, phrases, signs and symbols comprising the original user writing, where necessary, to generate a modified writing that more clearly conveys a semantic content intended by the user, or consistent with the core principles associated with the 10 mechanisms, when compared to the original user writing. The computer system comprises a computer processor, a memory for storing a plurality of preconfigured modules and an I/O device for inputting an original writing from a user and for outputting a modified writing. The computer processor controls a rules module to perform a linguistic analysis on the original user writing received at the I/O unit in accordance with a plurality of rules to identify semantic inconsistencies in the relationships between the words, phrases, signs and symbols comprising the original user writing and upon finding semantic inconsistencies, the computer processor controls the rules module to generate the modified writing.

The computer processor also generates a map of the differences between the original writing and the modified writing and, generates an explanation of the differences between the original writing and the modified writing. The computer processor also generates an explanation of the differences between the original writing and the modified writing, where the map includes a listing of semantic rules used. The I/O device sends the modified writing map to an intended recipient, wherein the rules module includes a plurality of memory-stored mechanisms. The memory-stored mechanisms operate in reliance upon a plurality of word-phrase tools and, the word-phrase tools operate to supplement and diversify vocabulary including in the modified writing.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

In one embodiment, the invention provides a method for modifying communications, preferably written, between a user and the outside world, for example, a smart phone user texting or emailing to any user with an electronic device capable of receiving a written communication, which modification communicates to the user how to improve his/her writing and communication skills. To do so, the inventive method for modifying communications provides or implements a plurality of mechanisms that facilitate truthful speaking in the writing operated upon by focusing the writer's attention on the modifications made.

To make truthful speaking less artificial and more natural, each one of the plurality of mechanisms is adjustable to appear more or less often in the modified text. The frequency can vary from 0 to 100%, e.g., a user may program 50% for the disqualifiers mechanism. As a result, on average, every second time the word "but" is detected in the written text, the mechanism substitutes the word "and" for "but." The user may choose to vary the frequency for all of the plurality of mechanisms independent of each other, which results in a multidimensional complexity, since there are a huge number of combinations of the 10 mechanisms to be applied independent of each other. Put another way, the user, by trial and error, can discover the best fit for his or her self concerning how the truthful language is expressed. Furthermore, different frequency combinations are used for different settings they are employing. Social texting may sound and feel better in one mechanism combination, while business writing may be preferred using another combination.

The invention may operate in the general context of computer software code or machine-useable instructions, including computer-executable instructions such as program modules. These instructions are executed by a computer or other machine, such as a personal data assistant or other hand-held electronic device. The program modules include protocols, routines, programs, objects, components, data structures, etc., and refer to code that performs particular tasks or otherwise operates on data types. The inventive systems and methods described herein may be practiced on a variety of system configurations, including hand-held devices, consumer electronics, general-purpose computers, specialty computing devices, and other similar devices, in particular cellular phones such as Smart phones that have texting and email capabilities. The inventive concepts may also be practiced in networked environments, including distributed computing environments where tasks are performed by remote-processing devices that are linked through a communications network.

Computer-readable media include both volatile and non-volatile (non-transitory) media, removable and non-removable media, and contemplates media readable by a database, switch, and various other network devices. By way of example, computer-readable media includes, but is by no means limited to, media implemented in any method or technology for storing information. Exemplary stored information includes computer-useable instructions, data structures, program modules, and a variety of other data formats. Media examples include, but are not limited to, information-delivery media, RAM, ROM, EEPROM, flash memory or other memory technology, compact discs (CD), digital versatile discs (DVD), optical discs, magnetic tapes, magnetic disks as well as other magnetic storage devices. These technologies may store data momentarily, temporarily, or permanently.

Figure 1:
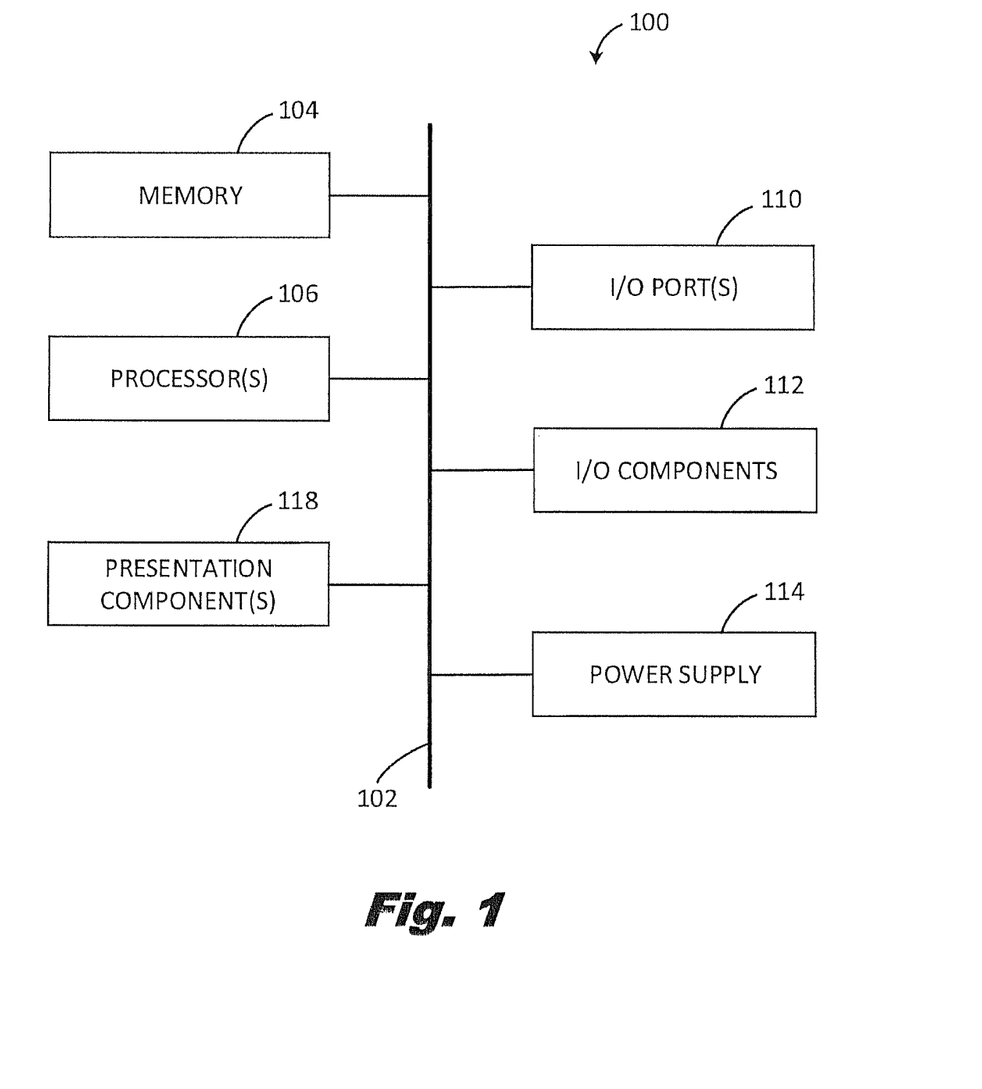
FIG. 1 is a block diagram showing an exemplary computing device in accordance with certain embodiments of the invention.

FIG. 1 displays a representation of an exemplary operating environment for implementing embodiments of the invention in the form of computing device 10. Computing device 100 is exemplary of a suitable computing environment and is not intended to and should not be read to suggest any limitation as to the scope of use or functionality of the invention.

Computing device 100 includes a bus 102 that directly or indirectly couples the following components: memory 104, one or more processors 106, one or more presentation components 108, input/output ports 110, input/output components 112, and a power supply 114. Bus 102 may be one or more busses (such as an address bus, data bus, or combination thereof). As one of skill in the art would appreciate, the various components shown in FIG. 1 may be merged and combined. For instance, a display device might serve as both an I/O component and a presentation component. Similarly, processors have memory. Thus, it is to be understood that FIG. 1 is merely illustrative of an exemplary computing device that can be used in connection with one or more embodiments of the invention. All categories of computing devices such as a "workstation," "server," "laptop," "hand-held device," etc., are contemplated and within the scope of FIG. 1 and referenced herein as a "computing device."

Memory 104 includes computer-storage media in the form of volatile as well as nonvolatile (non-transitory) memory. This memory may be removable or non-removable or a combination thereof. Exemplary hardware devices may include solid-state memory, hard drives, optical-disc drives, etc. Computing device 100 includes one or a plurality of processors 106 that read data from components such as memory 104 or I/O components 112. Presentation component(s) 108 present indications of data to a user or other device. Exemplary presentation components 108 include visual display devices, speakers, printers, etc. I/O ports 110 allow computing device 100 to be coupled with and in communication with other devices including other I/O components 112, which may be part of the computing device 100 itself. Illustrative I/O components 112 may include microphones, trackballs, scanners, cameras, printers, keyboards, touch sensitive devices, including touch sensitive screens, other interactive display devices, or a mouse.

In one embodiment, for example, the inventive method processes an original user writing, implemented by a computer processor, to modify relationships between words, phrases, signs and symbols comprising the writing, where necessary, to generate a modified writing that more clearly conveys a semantic content intended by the user, or guided by Truthful Speaking principles, when compared to the original user writing. The method does so by receiving an original writing from a user, processing to perform a linguistic analysis on the original user writing in accordance with a plurality of rules to identify semantic content, and, based on the processing, and the semantic content, altering the relationships between the words, phrases, signs and symbols within the writing, where necessary, to realize a modified writing reflecting the altered relations.

The original user writing may be received in a pc in which the application program implementing the method is operations. Alternatively, the original user writing may be generated in the pc, where the inventive method and application program is operational. In that case, the application program includes an application program interface that monitors and cooperates with any written word generating applications or communication applications to access the original user writings generated thereby.

The step of altering the relationships includes generating a description highlighting a difference between a connotation of the altered words, phrases, signs and symbols altered before and after alteration. Preferably, generating the description includes communicating a semantic rule. The method can also include a step of communicating the modified writing to a receiver and preferably, communicating the reason for making the necessary changes made to the original user writing and included in the modified writing to a receiver. The step of processing can include implementing at least one of a plurality of mechanisms, wherein the plurality of mechanisms operate in reliance upon a plurality of word-phrase tools. Preferably, the plurality of mechanisms includes 10 mechanisms. In one form, the word-phrase tools operate to supplement and diversify vocabulary including in the modified writing. The method also includes a step of configuring the pre-programming the processing to define how often each mechanism is utilized is step of processing.

In another embodiment, the invention includes computer program product comprising program code means embodied in a non-transitory computer readable, which upon processing by a computer, executes a method for processing an original user writing to modify relationships between words, phrases, signs and symbols comprising the writing, where necessary, to generate a modified writing that more clearly conveys a semantic content intended by the user when compared to the original user writing, as described above.

Figure 2:
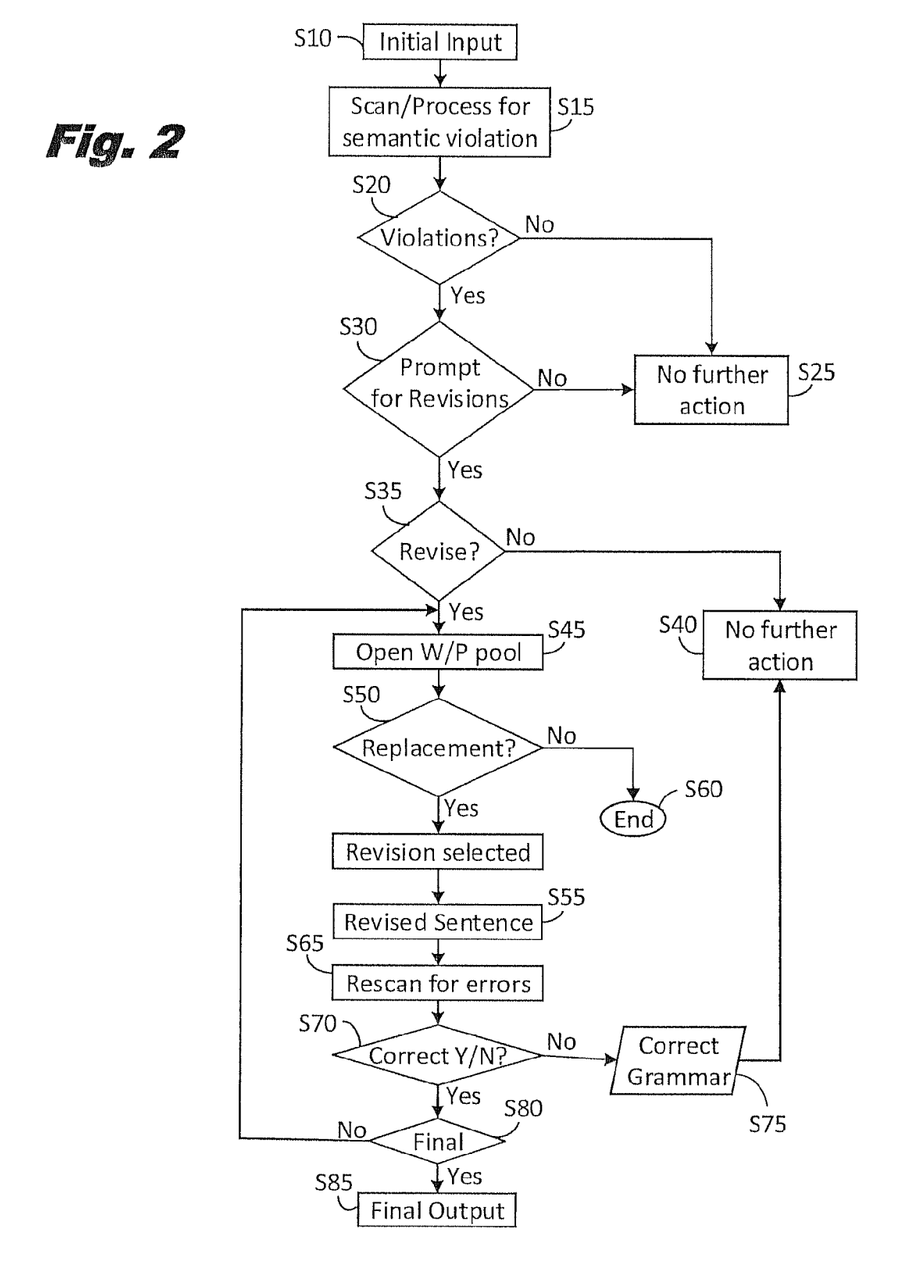
FIG. 2 is program flow diagram depicting one method embodiment of the written word refinement system of the invention.

FIG. 2 presents flow chart that presents yet another embodiment of the inventive method. There, block s10 represents a step of initiating input in a form of receiving an original user writing via an I/O device of via an API to the application program. Then, a step of scanning or processing the original user writing is implemented, as indicated or represented by block S15 in FIG. 2. If semantic violations are not found (block S20), no action is taken, as represented by block S25. If semantic violations are found, the writing is paired with corresponding mechanisms (as represented by block S30) and then, further processing occurs including opening corresponding word/phrase pools, as represented by block S45.

The processing then determines whether a replacement must be made, i.e., a modified writing. If yes, a modified writing is implemented (block S55) but if no, the process ends (block S60). The altered or modified writing is then re-scanned, as represented in block S65. The rescanned writing is further processed to determine grammatical correctness, as indicted by block S70. If grammatically correct, the writing is output to a final edit stage (380) and output (S85). If not grammatically correct, grammar is corrected (Block S75) until no further action is required (S40), sent to final edits block S80 and output (S85). Modifications to the method may be implemented.

Figure 3:
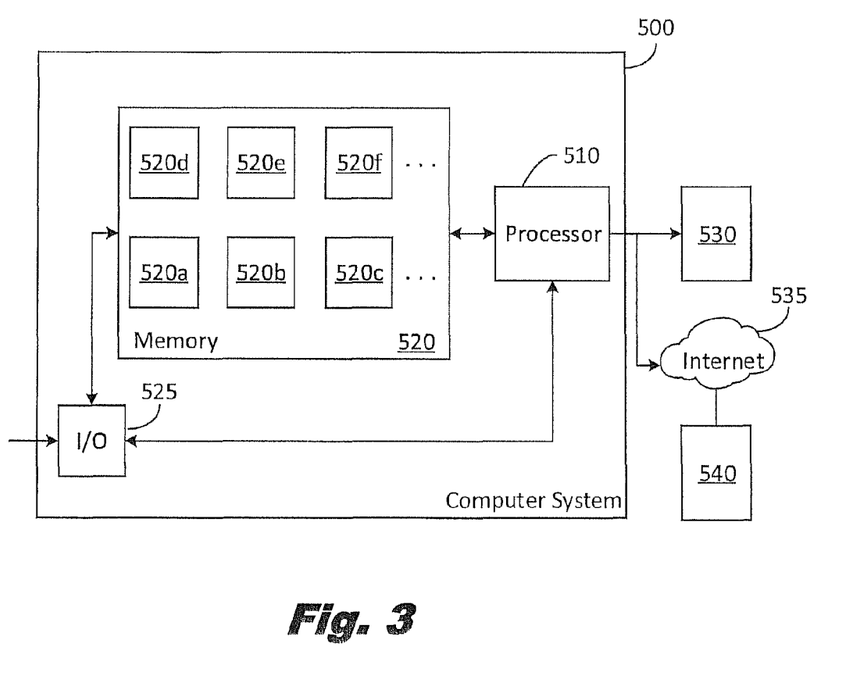
FIG. 3 is a block diagram representing a system embodiment of the written word refinement system of the invention.

In another embodiment, the invention includes a computer system 500 programmed to process an original user writing to modify relationships between words, phrases, signs and symbols comprising the original user writing, where necessary, to generate a modified writing that more clearly conveys a semantic content intended by the user, or consistent with the core principles associated with the 10 mechanisms, when compared to the original user writing, as depicted in FIG. 3. The computer system comprises a computer processor 510, a memory 520 for storing a plurality of preconfigured modules 520a, 520b, 520c, . . . and an I/O device 525 for inputting an original writing from a user and for outputting a modified writing. The computer processor controls a rules module to perform a linguistic analysis on the original user writing received at the I/O unit in accordance with a plurality of rules to identify semantic inconsistencies in the relationships between the words, phrases, signs and symbols comprising the original user writing and upon finding semantic inconsistencies, the computer processor controls the rules module to generate the modified writing.

The computer processor 510 also generates a map of the differences between the original writing and the modified writing and, generates an explanation of the differences between the original writing and the modified writing. The map may be stored in memory 520 or may be stored in peripheral memory 530, or even memory 540 accessible through the Internet 535. The computer processor 510 also generates an explanation of the differences between the original writing and the modified writing, where the map includes a listing of semantic rules used. The I/O device sends the modified writing map to an intended recipient, wherein the rules module includes a plurality of memory-stored mechanisms. The memory-stored mechanisms operate in reliance upon a plurality of word-phrase tools and, the word-phrase tools operate to supplement and diversify vocabulary including in the modified writing.

In greater detail, the inventive method implements ten mechanisms, including:
  M1 DISTANCING FACTS FROM THOUGHTS
  M2 DISTANCING THOUGHTS FROM THE SELF
  M3 DISTANCING THE SELF FROM THE OBSERVING SELF
  M4 ELIMINATING DISQUALIFIERS
  M5 ELIMINATING ARBITRARY CAUSALITY
  M6 ELIMINATING SUBJECTIVE OBLIGATION
  M7 ELIMINATING WORDS THAT DISEMPOWER ACTIONS
  M8 DISCRIMINATING BETWEEN OURSELVES AND OUR THOUGHTS, FEELINGS AND ACTIONS
  M9 KEEPING EXPERIENCES IN THE HERE AND NOW
  M10 USING OBSERVER-GENERATED COMMITMENTS TO GUIDE AND EMPOWER ACTIONS The first three mechanisms are designed to create experiential distance between the writer and his or her thoughts and feelings, as well as distance between the essence of the writer as an observer of thoughts and feelings and their conceptualized sense of self. The mechanisms are first identified by number and title in the exemplary embodiment, and then explained.

M1—Distancing the Facts from the Thoughts. Mechanism M1 process a sentence such as "The Earth is flat." and converts it to a sentence such as "I think the Earth is flat." A large pool of alternate words or phrases unique to this mechanism, expressing the same principle such as "In my opinion the Earth is flat." or, "I believe the Earth is flat." Is utilized.

The rationale behind the mechanism M1 modifications is that in everyday speaking and writing, propositions (beliefs) are given as though they are facts. The inventive method modifies such sentences by declaring both the person speaking the belief and the belief itself. In so doing, a subjective experiential space is created, where the speaker and the speaker's spoken belief are felt at the same time, in the present moment, and in the Now.

M2—Distancing Thoughts from the Self. Mechanism M2 takes the sentence "The Earth is flat." and converts it to "I'm observing the thought that the Earth is flat." or some variation of "observing" from the mechanism's corresponding pool of alternate words and phrases. An example is "I'm contemplating the belief that the Earth is flat."

The rationale behind the mechanism M2 modification is the conventional experience of one's identity represented in language by the word "I" to one of an observer or experiencer of thoughts feelings and actions that has no tangible basis in physical reality. More specifically, one's True Self is defined as the source of observation of thoughts and feelings, as well as the direct cause of speaking and doing.

M3—Distancing the Self from the True Self. Mechanism M3 takes the sentence "The Earth is flat." and transforms it into "There is the observation of the thought that the Earth is flat." or some similar version from the word/phrase pool. Notice that M3 has excluded all forms of the mental constructs of "I" or "me."

The rationale behind the mechanism M3 modification is the conventional experience of one's identity represented in language by the word "I" to one of an observer or experiencer of thoughts feelings and actions that has no tangible basis in physical reality. The latter is often referred to as the True Self. More specifically, one's True Self is defined as the source of observation of thoughts and feelings, as well as the direct cause of speaking and doing. This perspective is at the heart of what the inventive method and system are designed to facilitate, i.e., to lead a person into experiencing and ultimately guiding into actions based on choice and free will.

In the mechanisms M1, M2 and M3, if emotions are expressed instead of thoughts, the form becomes: "I'm observing the feeling of sadness, etc."). For Mechanisms M1, M2 and M3, the modified phrase will generally begin the sentence, as is the case above, and can less frequently be inserted in the middle or the end of that sentence. For example the sentences "The Earth, in my opinion, is flat." or The Earth is flat, in my opinion." are equally acceptable. These type of variations produce the richness and multidimensionality to the language the software is creating.

It is important to emphasize that in the above and, in the remaining seven mechanisms, the essence of the message's ideas are left intact. This requirement is essential for the program's output at all times.

M4—Eliminating Disqualifiers. Mechanism 4 identifies disqualifiers such as the word "but" or "however" and substitutes it with bridge words such as "and," or some other variant, or with no word at all. "I love my dog but he barks too much." becomes "I love my dog and he barks too much." Or "I love my dog. He barks too much."

The rationale behind the mechanism D4 modification is that disqualifiers function to fragment rather than integrate experiences. Truth generally seeks to include all things in one's experience, not just the ones one wishes to have or is comfortable with. In psychotherapy, words like "but" often emerge when a client is resistant. They may say "my father beat my mother all the time, but he was a wonderful man.

Disqualifiers also function in minimizing emotional discomfort by eliminating conflicting emotions. It can be uncomfortable and confusing to both have feelings of love and hate for a person or oneself at the same time. Having simultaneous conflicting thoughts and feelings are in the domains of truth and in the here-and-now. This possibility to be willing and able to observe and experience all of one's emotions and take responsible actions is at the heart of what the inventive method is and what inspires that the software application be named as such.

M5—Arbitrary Causality. Mechanism M5 addresses arbitrary causality as reflected by words and phrases such as "because" and "for that reason." These words or phrases are replaced by phrases such as "connected with" and "related to." For example, "I got into an automobile accident because I was upset at the time." becomes "I got into an automobile accident and that was related to my being upset at the time."

The rationale behind Mechanism M5 is illustrated in the following: If I open my hand and a pencil falls to the ground, people invariably say that it fell because of gravity. Gravity is simply a label for two objects being attracted to one another. Gravity does not identify any true cause for this attraction.

Another representative conventional example is:

"The pencil fell down when I opened my hand because of gravity."

A representative Truthful Speaking example is:

"I'm observing the thought that the pencil falling to the ground is connected to my hand opening and there is the observation of the thought that I don't know what caused it to fall to the ground."

This statement is indeed truthful. Asking scientists for the ultimate cause of any consistent pattern of two seemingly independent actions will result in reaching a point where their level of understanding is exhausted. Another way of stating this event Truthfully is:

"I'm observing the thought that the pencil fell to the ground when I opened my hand because the pencil fell down when I opened my hand."

Further concerning Mechanism M5, the conventional belief is that the reasons we take all actions are the direct result of what we believe and how we feel. If a person is asked why they took a given action, the reasons given are always thoughts and feelings. The inventive method asserts that while thoughts and feelings can guide actions, they never actually come to cause them. If someone gives us advice and we take it, that person did not cause the action. Instead, the observer of beliefs and emotions looks at their own thoughts and feelings and takes a course of actions independent of them.

From this point of view, it is possible to think and feel one way and act another way. This can be liberating in that one is no longer required to change their beliefs and emotions to take actions to the contrary. Instead, one has the ability to have doubts and fears about doing something and still do it.

M6—Subjective Obligation. Mechanism M6 identifies words expressing subjective obligation such as "must" and "should," and modifies them into words reflecting free will such as "choose to" or "decide."

For example,

"I have to finish this assignment tomorrow." becomes "I choose to finish this assignment tomorrow."

The rationale behind Mechanism M6 is that conventional use of words inferring subjective obligation reflects and expresses disempowerment. A cornerstone of the inventive method is the observed belief that persons have complete choice over their actions. Truthfully speaking, people do not have to do anything. Some actions may make negative outcomes more likely. And people can choose to do them and face these consequences.

A further observed Truthful assertion is that events do not ultimately cause other events. Instead, things happen because they happen, and some events are more often associated with other events for reasons we do not know. "Must" and "Should" imply that there are strong causal relationships between events A conventional example is:

"I must get my dog to stop barking or my landlord will evict me."

A Truthful Speaking example is:

"I'm observing the thought that I choose to take actions connected with having my dog stop barking. The observed thought is that I make this choice for no particular reason, and the observed belief is that a quite dog is less likely to have me evicted."

Examples that involve "should" regarding separate events independent of the person's actions now follow:

Conventional speaking is expressed as follows:

"When interest rates rise, the price of gold should also rise."

A truthful example is:

The thought observed is that a rise in interest rates is connected with a rising price of gold."

M7—Disempowering Words. Mechanism M7 identifies disempowering words such as "try" and "attempt" and substitutes empowering ones such as "will," and "shall." For example, the sentence "I will try to get to the theatre on time." becomes transformed to "I will make it to the theatre on time."

In conventional speaking, use of words such as "try" and "attempt" are common. Such words establish tentative conditions to an outcome when an action is taken. A conventional example is:

"I will try to make my dog stop barking by training him if he wants to."

In the perspective of the inventive method, there is no direct causal relationship between the dog's motivation and the outcome of not barking. A course of action is spoken, declared, and followed through. If this intention is "True" then it will be accomplished. After all, proper dog training is eventually associated with behavior change.

A Truthful Speaking example is:

I'm observing the thought that I will train my dog to stop barking."

M8—Discriminating Self from Thoughts, Feelings & Actions

Mechanism M8 looks to differentiate the person from what the person has. The modification addresses several forms of language ranging from being labeled, to, identifying oneself as a thought or a feeling. The basic format is replacing the word "am" with "have," or inserting words or phrases from mechanisms D1, D2 or D3. Several examples are as follows:

"I am an alcoholic." or "I have the condition of alcoholism."

"I am angry." or "I am observing feelings of anger."

"I am confused." or "I notice confusing thoughts."

The rationale behind Mechanism M8 is to underscore that the person is more than the sum of his or her own parts. The parts of the person are their names, roles, body, beliefs, emotions, histories, jobs and so forth. Saying "I'm an engineer" is not truthful. That is the person's occupation, not the person. The essence of the person is the observer of that occupation and all the other experiences they are having in the present moment. Saying "I have a career as an engineer." falls within a truthful context.

M9—Being in the Here-and-Now. Mechanism M9 looks to intermittently or continuously remind the user that they are in the present moment of now. Inserting the word "NOW," or its variants, such as the phrase "I AM IN THE PRESENT MOMENT." into randomly selected sentences, does this. As with all mechanisms, the user can configure the percent occurrence of this modification. The words or phrases can be placed inside the sentence, as in the case of:

"I'm observing the feeling NOW that math is frustrating Me." or between sentences in a conversation such as "This will never work." NOW "I've wasted two weeks on repairing this motor." NOW "It will never get done." NOW. Within a sentence "now" can be inserted wherever it is grammatically feasible to reinforce the commitment to the present timeframe. A variation of "now" is the word "here." The latter can be combined with the former, or stand alone:

"I am observing my determination here and now to exercise 5 days this week." or "I am experiencing my resolve right here to exercise 5 days this week." The essay was written poorly." or "The essay is written poorly."

The rationale behind Mechanism M9 is that when we choose to step out of language with the assistance of Mechanisms M1, M2, M3, M5 and M8, the mental constructs of "past" and "future" dissolve. This is (because) they are associated with the assertion that they are only a function of language. Once out of language, there is only the experience of NOW. When looking to conceptualize the concept of NOW, it too disappears as it falls into the realm of language and out of experience. Mechanism M9 looks to continuously bring users back into the experienced moment of NOW and to the experienced place of HERE.

M10—Commitment. Mechanism M10 addresses a single empowering word called "commitment." The definition of commitment used here is "A declaration of action whose direct source is the observer of thoughts and feelings (the True Self) instead of the thoughts and feelings themselves." Unlike the other 9 mechanisms, "commitment" has no substitute. A weaker variation utilized in Mechanisms M6 and M7 is "choose." Commitment can be substituted for words like "try" and "must." Commitments, unlike plans, wishes, wants, musts, have to, need to and the like are specific regarding behaviors and time frames.

For example, "I want to lose weight." becomes:

"I am committed to losing 15 lbs. in 6 weeks by going to the gym three times a week and limiting bread and other carbs to once a day."

Sentences can contain multiple Truthful Speaking mechanisms simultaneously. An exaggerated example is:

"I want to go to the opera because I have great seats but it's very late and I will try to get there."

which becomes according to the inventive method, "I'm observing the thought that I choose to go to the opera NOW, connected with the consideration that I have great seats, and the observed thought that it's very late, and I am committed to getting there."

The Word-Phrase Pools

The inventive method (or truthful speaking) identifies specific words or phrases that distort or fragment experiential reality or disempower actions. These will trigger a replacement with word-phrase selections that clarify and complete a person's experiences and guide them into empowered actions. In addition, strategically inserted words or phrases that assist the user to experience their internal dialogue more objectively, and at an experiential distance, and others that facilitate the person's contacting experiences in the here-and-now, will be utilized from word-phrase pools. The latter will not require specific text to trigger their implementation. User preprogramming or configuration of the percent of sentences such word-phrases are to appear will trigger their utilization. As a result, a vast array of truthful sentences can be generated by users and placed into a collective word pool after being selectively edited for appropriateness of content.

Frequency of use can be determined by what phrases are most popular.

It is essential to the inventive method that the word-phrase pools be as comprehensive as possible. This allows for the identification of all words that disempower actions and distort reality. More importantly, a rich variety of replacement words and phrases, as well as those automatically generated by preprogramming, ensure that the output text appears fresh, creative, and interesting. If this were not so, the user would quickly lose interest in the app. WORD-PHRASE POOLS AND THEIR CREATIVE IMPLEMENTATION ARE CRITICAL FOR THE TRUTHFUL SPEAKING APPLICATION TO SUCCEED.

The names of the Word-Phrase Pools lists now follow, with the lists themselves presented thereafter.

1. OBSERVING. Variants include

| | | |
|---|---|---|
| Detecting | Picture | Sketch |
| Watching | Consideration | Outline |
| Perceiving | Philosophy | Concept |
| Witnessing | Knowledge | Perception |
| Seeing | Judgment | Impression |
| Spotting | Contemplation | Essence |
| Noticing | Estimation | Substance |
| Viewing | Attitude | Point |
| Beholding | Outlook | Meaning |
| Minding | Perspective | General Picture |
| Looking at | Regard | General Idea |
| Considering | Gist | Principle |
| Understanding | Indication | Fundamental Nature |
| Imagining | Notion | Opinion |
| Reflecting on | Sense | Formulation |
| Reasoning | Conception | |
| Idea of | Image | |

The first word-phrase pool is associated with Mechanisms M1, M2, and M3.

2. POSESSIVE OBSERVATION. This pool contains many combinations of phrases. Variants include I'm observing the thought that . . . .
There's the observation of the thought that . . . .
There's an observation of the thought that . . . .
The thought being observed is . . . .
The observed thought is . . . .
An observation . . . (the thought)
My observed thought is . . . .
My observation of the thought is . . . .
I'm having the observation of the thought that . . . .
I'm experiencing the thought that . . . .
My experienced thought is . . . .
I'm detecting the thought that . . . .
I'm imagining the idea that . . . .
A belief now observed is . . . .

NOTES: In all the above examples feelings and emotions can be fully interchanged with thoughts and beliefs. Ex. "My observed emotion is . . . or "An emotion now observed is . . . ."

This pool is far from exhaustive, and the programming may be able to generate a variety of additional phrases. The second word-phrase pool is associated with Mechanisms M1, M2, and M3.

3. VARIATIONS OF "THOUGHT." Variants include
IDEA
CONCEPT
REFLECTION
IMPRESSION
BELIEF
DESIGN
PLAN
SUGGESTION
CONCEPT
SCHEME
OBJECTIVE
NOTION
SENSE
OPINION
CONCEPTION
VIEW
CONSIDERATION
OUTLOOK
POSITION
POINT OF VIEW
PERSPECTIVE
STANDPOINT OF
REALIZATION OF
CONVICTION The third word-phrase pool is associated with Mechanisms M1, M2, and M3.

4. VARIATIONS OF "FEELINGS." Variants include
EMOTION
MOOD
SENSATION
REACTION TO
IMPRESSION
SENTIMENT
PASSION
EXCITEMENT
AFFECT The fourth word-phrase pool is associated with Mechanisms M1, M2, M3 and M8.

5. VARIATIONS OF "BUT." Variants include
HOWEVER
NEVERTHELESS
EXCEPT
YET
JUST
THEN AGAIN
ON THE OTHER HAND
NONETHELESS
ALTHOUGH
IN CONTRAST
YET
STILL
THOUGH
EVEN SO
ALL THE SAME
HITHERTO
APART FROM
ASIDE FROM
WITH THE EXCEPTION OF "The fifth word-phrase pool is associated with Mechanism M4. This word-phrase pool is utilized strictly to identify words that need to be flagged and then substituted with those of another pool.

6. VARIATIONS OF "AND." Variants include
AND
ALSO
AT THE SAME TIME
SIMILTANEOUSLY
PLUS
MOREOVER
AS WELL
WITH This word-phrase pool is utilized strictly to replace words identified in word-phrase pool 5. The sixth word-phrase pool is associated with Mechanism M4.

7. VARIATIONS OF "BECAUSE." Variants include
SINCE
AS FOR
FOR THE REASON THAT
THE ORIGIN IS
BASIS
FOUNDATION
GROUNDS
ROOT
SOURCE This word-phrase pool is utilized strictly to identify words that need to be flagged and then substituted with those of another pool. The seventh word-phrase pool is associated with Mechanism M5.

8. VARIATIONS OF "ASSOCIATED WITH." Variants include
CONNECTED WITH
ATTACHED TO
JOINED WITH
RELATED TO
ALLIED
COUPLED
INTERACTS WITH
LINKED
CORRELATED
INTERRELATED
ACCOMPANYING
CONCOMITANT
CONCURRENT
ATTENDANT
SIMULTANEOUS WITH
SYNONYMOUS WITH
ANALOGOUS
GLUED TO
TETHERED
BOUND TO
FASTENED
TIED
SECURED TO
CHAINED
UNITED This word-phrase pool is utilized strictly to replace words identified in word-phrase pool 7. The eighth word-phrase pool is associated with Mechanism M5.

9. VARIATIONS OF "MUST." Variants include
SHOULD
NEED
HAVE TO
OUGHT TO
GOT TO
OBLIGATED TO
HAD BETTER
SUPPOSED TO
EXPECTED TO
NECESSARY

REQUIRED TO
REQUISITE

This word-phrase pool is utilized strictly to identify words that need to be flagged and then substituted with those of word-phrase pool 10. The ninth word-phrase pool is associated with Mechanism M6.

10. VARIATIONS OF "CHOOSE." Variants include
SELECT
DECIDE
PICK
CHERRY PICK
PICK OUT
GO FOR
OPT
MAKE UP YOUR MIND This word-phrase pool is utilized strictly to replace words identified in word-phrase pool 9. The tenth word-phrase pool is associated with Mechanism M6.

11. VARIATIONS OF "TRY." Variants include
ATTEMPT
GIVE EFFORT
TAKE A CRACK
GIVE IT A SHOT
TAKE A STAB
ENDEAVOR TO
STRIVE
STRUGGLE
UNDERTAKE
WORK ON
MAKE SURE OF This word-phrase pool is utilized strictly to identify words that need to be flagged and then substituted with those of the word-phrase pool 12. The eleventh word-phrase pool is associated with Mechanism M7.

12. VARIATIONS OF "DO." Variants include
PERFORM
SET TO
ACT ON
TAKE ACTION
BEHAVE This word-phrase pool is utilized strictly to replace words identified in word-phrase pool 11. The twelfth word-phrase pool is associated with Mechanism M7.

13. VARIATIONS OF "AM." Variants include FOR "AM" THE VARIANTS ARE "IS" AND "ARE," WHEN DISCUSSING ANOTHER PERSON OR PERSONS AS IN "I AM SAD," "HE IS SAD," "THEY ARE SAD." CORRECTED VARIANTS FOR THE ABOVE ARE: "I HAVE SADNESS," "HE HAS SADDNESS," "THEY HAVE SADNESS."
THE WORD-PHRASE POOL TO "HAVE" IS:
OWN
POSSESS
TAKE RESPONSIBILITY FOR
PURCHASE
BUY
RENT
DWELL IN
LIVE IN This word-phrase pool is utilized strictly to identify words that need to be flagged and then substituted with those of word-phrase pools 1-4. The thirteenth word-phrase pool is associated with Mechanism M7.

14. VARIATIONS OF "NOW." Variants include
PRESENTLY
IN THE MOMENT
RIGHT NOW
AT THIS TIME IMMEDIATELY
AT THIS INSTANT
AT THIS POINT
AT THIS JUNCTURE,
MINDFULLY YOURS (AT THE END OF A LETTER OR MESSAGE)
THE MANTRA: "NO LANGUAGE, NO LANGUAGE, NO LANGUAGE, NO LANGUAGE, NO LANGUAGE, NO LANGUAGE, NO LANGUAGE, NO LANGUAGE, NO LANGUAGE, NO LANGUAGE, NO LANGUAGE. THE RANDOM TEXT INSERT: I'M EXPERIENCING THE THOUGHT: EIOPDSK LDJFJA KEI OERIW LKDJFEIO.

This word-phrase pool is utilized to insert words or phrases into a sentence without replacing anything from the existing text. User programming determines frequency of its use. The fourteenth word-phrase pool is associated with Mechanism M9.

15. VARIATIONS OF "HERE." Variants include
PRESENTLY
AT THIS SPOT
UNDER MY FEET
IN THIS DOMAIN
UNDER THIS ROOF
WHERE WE ARE
AT THIS JUNCTURE This word-phrase pool is utilized to insert words or phrases into a sentence without replacing anything from the existing text. User programming determines frequency of its use. The fifteenth word-phrase pool is associated with Mechanism M9.

16. VARIATIONS OF "COMMITMENT." There is no word-pool here as there is no word that can properly be substituted so as to convey the true definition of the word. The sixteenth word-phrase pool is associated with Mechanism M10.

17. VARIATION ON BORDERLINE DISEMPOWERING WORDS. Variants include:
MAYBE
POSSIBLY
PERHAPS
IT'S UNCLEAR
IT DEPENDS
I'M NOT SURE Such words border on being disempowering and still have utility in communication. The software flags these words and highlights them in the converted text.

At times these words can be used appropriately and responsibly. In other instances they can function to disempower action. Therefore these words will be flagged and color coded on the translated text and will not be altered or replaced. This serves as a caution to make the user mindful of this possibility.

The seventeenth word-phrase pool is associated with Mechanism M7.

18. ENHANCED DISTANCING PHRASES. In looking to create ever more experiential distance between the observer and the observed thoughts and emotions, this phrase pool is created. It looks to combine words and phrases in word-phrase pools 1-4 and other sources so that the text produced is longer and creates further distance between the observer and what is observed.

Variants Include:
AN OBSERVED THOUGHT WHICH JUST AROSE OUT OF THE SPACE OF POSSIBLITY THAT IS ME IS THAT . . . THE TV IS BROKEN.

THE CONCEPT AUTOMATICALLY GENERATED BY MY BRAIN AND WITNESSED BY MY ESSENCE IS THAT . . . IT'S GOING TO RAIN TOMORROW.
I HAVE NO IDEA WHY MY BRAIN JUST BLURTED OUT AND TOLD ME THAT . . . HILLARY CLINTON WILL HAVE AN ALL FEMALE CABINET WHEN SHE BECOMES PRESIDENT.
I HAVE THIS PRECONCEIVED, BELIEF WHICH I GET IS BIASED AND DISTORTED BY THE LANGUAGE AUTOMATICALLY REATED BY MY BRAIN THAT . . . .
I'M LOOKING AT THE THOUGHT I'M NOT HAVING, JUST THE ONES THAT MY BRAIN IS GENERATING ALL BY ITSELF, THAT ARE SAYING . . . .
THE THOUGHTS UNCONTROLLABLY GENERATED BY MY BRAIN NOW ARE . . . .

The eighteenth word-phrase pool is associated with Mechanisms M1, M2 and M3.

19. APHORISMS. These entail brief sayings consistent with the inventive method non-philosophy and experiential state the app facilitates. The aphorisms are inserted randomly at the user's request.

The aphorisms entail brief sayings consistent with the inventive method non-philosophy and experiential state the app facilitates.
IF ITS YOU THINKING, THEN STOP THINKING.
DON'T BELIEVE ANY OF THIS. IT'S JUST LANGUAGE.
DO IT FOR NO PARTICULAR REASON.
WHAT I'M ABOUT TO TEXT YOU IS JUST A STORY, NOT REALITY.
SO WUT?
A THOUGHT: MAYBE, JUST MAYBE I CAN ALLOW MYSELF TO THINK AND FEEL ONE WAY AND ACT ANOTHER WAY.
I GET THAT MY BRAIN GETS THAT I GET THAT MY BRAIN IS TRYING TO CONTROL ME THROUGH LANGUAGE, AND MY GETTING ALL THAT IS A PRODUCT OF THE LANGUAGE THAT IT GENERATES THAT I CAN CHOOSE TO JUST OBSERVE OR FALL BACK INTO.

Phrases like these can be randomly inserted to a person texting if they choose this option.

Operation

Once downloaded, configured and operational in a user's computer, the inventive method must be deployed by turning its functional operation on and off. At start-up, the display function presents a user icon in the display that is responsive to a click for On or Off. When inactive, there will be no modifications to the user's text. More sophisticated options involve the user deciding if only they observe the converted message, or if it gets sent on to their recipient. The user also has the option of blocking any truthful speaking messages sent by other users.

The inventive method enables the user to translate archived text messages (even those composed before the software is downloaded or received while the program is in "off" mode.)

Chatting with Other Users

If the recipient of a writing has the inventive method or application program operational on their computer, the application programs cooperate so that both users communicate in active "Truthful Speaking" mode. As such, several possibilities of operation will arise, explained by use of the following examples.

User #1 sends a text message to user #2, whereby user #1's typed message is converted via the software. User #2 receives this communication, where the application program running on user 3's computer converts the incoming text into truthful speaking mode by their own unique criteria of word-phrase pools.

As a result, two separate truthful speaking messages will appear for user #2, those of user #1 and their own conversion of it. This outcome, however, can be simplified in several ways. User #1 can configure its active embodiment of the software program so the outgoing messages are not translated. User #2 can configure its active embodiment so that if user #1 sends an un-translated text, their own software application will convert it.

Similarly if user #1 opts to send translated text, user #2 can opt to have their software program not translate it. The latter option appears to be simplest and most elegant and at the same time, all options are viable.

Chatting with Non-Users

Even though the application program that implements the inventive method is downloaded and operational on a user's computer, it does not have to be used with outgoing messages/writings. That is, users can use the application program alone or by interacting with others. In the former, the user may compose a text message, paragraph, or many pages on their computer (e.g., smart phone text page) just to themselves and have the application program translate the message. The user may then e-mail the translated text to their own email or similar program and print it or forward it to other destinations.

When utilizing the application program with other users via texting or e-mail, the communication by its design is seamless if all users involved have the application program operational on their computer device. All users can send and receive texts truthfully formatted.

Special considerations are required when one user has the application program and the other does not. Application program users can convert their sentences into a truthful form and send them out to any other user capable of receiving same. Those who receive such messages but not have the application software nevertheless receive transformed text from users at which the program is operational. They will be unable to translate their own text when responding. This limitation may be circumvented by the program's ability to take that un-translated text, convert it, and e-mail it back to the non-user.

As should be apparent, this possibility may hinge on how much of the applicant program processing occurs within the sending user's computer. As a result, the application program allow non-users to translate their own texts when they are interacting with program users. The motivation for non-users to download the application program is that they will be enabled to use the programming for individual use and with other users who do not yet have the software.

Alarm Minders

THE ALARM MINDER APPLICATION ALLOWS THE USER TO PROGRAM REMINDERS ON WHEN AND HOW OFTEN TO PLACE THE TRUTHFUL SPEAKING SOFTWARE IN ACTIVE MODE. SHIFTING MODALITIES CAN EVEN BE DONE WHILE THE USER IS UNAWARE. THEY CAN BE TYPING OR TEXTING IN "OFF" MODE WHEN SUDDENLY SENTENCES APPEAR IN TRUTHFUL SPEAKING MODE, AS THEY WERE PROGRAMMED PREVIOUSLY.

Customized Language

Upon activating the Truthful Speaking program a menu bar will display the 10 and the 19 Word-Phrase pools. The user relies upon the user interface to access these functions make personal modifications to the default operation. For the Mechanisms, the user specifies a range between 0% and 100% of how frequently the software will modify a sentence when presented with an opportunity. For Word/Phrase pools, the user specifies the percentages of each word or phrase to be substituted. The user will also is enabled to insert their own word-phrase entries to customize their Truthful communication.

Text Porosity

In conventional mobile phone texting, the words of every sentence appear simultaneously and in black text. To make a somewhat artificial language like that generated by the application program more approachable, software generated timing of phrases is implemented. Here, rather than a sentence appearing simultaneously, the words in a sentence are staggered so as to mimic speech. For example, the sentence "The thought I now observe is that the Netherlands will win the World Cup" shows up as:

"The thought . . . I now observe . . . is that . . . The Netherlands . . . will win . . . the World Cup."

The entire sentence appears on one screen without the periods. The periods represent brief lapses in time. Text color coding also is implemented to enrich the communication based on the mood of the content. This option can be a stand-alone app separate from the Truthful Speaking software to enhance all texts.

Text Display

For each sentence, the user types text, which will appear on the top of the screen. The revised version will appear underneath. There will be an option to see the modifications made, identifying the mechanism(s) used at the very bottom of the screen. Incoming text will be treated similarly.

Text Editing

After a sentence is modified by the software, the user can directly edit the text before sending it, or press an icon requesting that the software generate a new modified sentence based on the original text. This can be done repeatedly, since there is a multitude of potential variations to the original sentence. Whatever modified sentence is chosen can then be further edited directly by the user before being sent out.

Ongoing Enhancements of User's Word-Phrase Pools and Sentences

Over time, a user's word-phrase pool is increased and modified in a number of ways. First, the user may access the pools and add their own unique words or phrases (i.e. "I copy that . . . " as an alternative to "I observe that . . . "). Second, the user may access the pool and modify the probability of each word's use. Third, when they actively use the sentence editing icon, the software continuously monitors their choices of computer generated sentences that they send on and learns which words and phrases they prefer. More importantly, the software learns and modifies the particular sentence structures they are most comfortable with. Fourth, an icon is created which the user presses when a particularly good truthful speaking sentence was generated by the software. Fifth, when a Truthful Speaking chat room is created, vast new word pools and sentence configurations can be developed and shared by all users.

Self-Monitoring and Feedback

Allows the user to get information on the number of instances in their text or any other text where what they write needs to be modified by the program and what those modifications are. For example, the information would be that in 450 sentences, 23 D1, 32 D4, 17 D6 etc. modifications were made. In this way, the person can learn effective skills while relying less on the software. This is then adapted into speaking truthfully without the use of the application program. Immediate feedback for each sentence typed will also be an option.

Positive Reinforcement

In this modality, the user is required to utilize all rules of truthful speaking without the aid of the application program. When the user conforms to the majority of the rules, the programming makes fewer corrections to the handful of errors that are made. Thusly users are reinforced or rewarded by having their text unaltered. If the user makes a higher percentage of errors, the programming will begin making alterations. The intention here is for the user to be gradually shaped into typing truthfully without the distraction of being frequently corrected by the application program.

Commitment and Action

Permits the user to declare commitments to actions and keep track of those actions. The software can also remind the user of commitments made in the past when Mechanism 10 was employed when texting.

Truthful Speaking Mechanism Key

| NUMBER CODE | MECHANISM |
| --- | --- |
| M1 | "I THINK" |
| M2 | "I'M OBSERVING THE THOUGHT THAT" |
| M3 | "THERE'S THE OBSERVATION OF THE THOUGHT THAT" |
| M4 | BUT/AND |
| M5 | BECAUSE/ASSOCIATED WITH |
| M6 | MUST/CHOOSE |
| M7 | TRY/DO |
| M8 | THOUGHTS/FEELINGS VS ACTIONS |
| M9 | NOW/HERE |
| M10 | COMMITMENT |

In Mechanisms M1-M3, the term "feelings" or their variations can be substituted for "thoughts," when appropriate. The application program defines feelings as one-word descriptions of what is going on inside the body. Mechanism M8 addresses this more directly, and it shows up in the M1-M3 Mechanisms.

EXAMPLES

Original Sentence Sample 1

After work I'm going to try to pick up my dry cleaning, but I don't think I'll have the time to do so.

Mechanisms Used

"Now" "I Think": "try/will," "but/and," "I'm observing the thought that": Coded: (M1), (M9), (M4), and (M3)

Basic Translation

I am thinking now that after work I will pick up my dry cleaning, and the observed thought is I will not have the time to do so.

Mechanisms of Basic Translation

I am thinking (M1) now (M9) that after work I will pick up my dry cleaning, and (M4) the observed thought is (M3) I will not have the time to do so.

Advanced Translation Version 1

I am convinced presently that after work I will pick up my dry cleaning, while at the same time I am mindful of the consideration that I will not have the time to do so.

Mechanisms of Advanced Translation Version 1

I am convinced (M1) presently (M9) that after work I will pick up my dry cleaning, while at the same time (M4) I am mindful of the consideration (M3) that I will not have the time to do so.

Advanced Translation Version 2

I am considering at this moment that after work I will pick up my dry cleaning, while at the same time I am looking at the belief that I will not have the time to do so.

Mechanisms of Advanced Translation Version 2

I am considering (M1) at this moment (M9) that after work I will pick up my dry cleaning, while at the same time (M4) I am looking at the belief (M3) that I will not have the time to do so.

Original Sentence Sample 2

Tonight I must decide whether to go to the mall with Stacy or with Elisha. I will go with Elisha because I detest Stacy's friend Stella.

Mechanisms Used

"I'm observing the thought" "Must/Choose": "because/associated with," "I think/feel,": Coded: (M2), (M6), (M5), (M1)

Basic Translation

Tonight, I'm observing the thought that after work I will choose to go to the mall with Elisha or Stacy. I will go with Elisha. This is associated with the feeling (M8) that I detest Stacy's friend Stella.

Mechanisms of Basic Translation

Tonight, I'm observing the thought that (M2) after work I will choose (M6) to go to the mall with Elisha or Stacy. I will go with Elisha. This is associated with (M5) the feeling (M8) (M1) that I detest Stacy's friend Stella.

Advanced Translation Sample 1

Tonight, my experienced perspective is that after work I will opt to go to the mall with Elisha or Stacy. I will go with Elisha. This is attached to the feeling that I detest Stacy's friend Stella.

Mechanism of Advanced Translation Sample 1

Tonight, my experienced perspective is that (M2) after work I will opt (M6) to go to the mall with Elisha or Stacy. I will go with Elisha. This is attached to (M5) the feeling that (M8) (M1) I detest Stacy's friend Stella.

Advanced Translation Sample 2

Tonight, I'm reflecting on the conviction that after work I will decide to go to the mall with Elisha or Stacy. I will go with Elisha. This is interrelated with the feeling that I detest Stacy's friend Stella.

Tonight, I'm reflecting on the conviction that (M2) after work I will decide (M6) to go to the mall with Elisha or Stacy. I will go with Elisha. This is interrelated with (M5) the feeling that (M8) (M1) I detest Stacy's friend Stella.

Original Sentence Sample 3

I attended a fundraiser today, and I'm thinking of donating some money, but I don't know if I should. I'm going to try to research this group to make sure it's legitimate, and maybe then I'll make the donation.

Basic Translation

The observed thought is that I attended a fundraiser today, and I'm thinking of donating some money, and I don't know if I will. I'm observing the thought that I will research this group by Friday to make sure it's legitimate, and if so then I commit to making a donation of $100.

Mechanisms of Basic Translation

The observed thought is that (M3) I attended a fundraiser today, and I'm thinking of donating some money, and (M4) I don't know if I will (M6). I'm observing the thought that (M2) I will research this group by Friday to make sure it's legitimate, and if so then I commit to (M10) making a donation of $100.

Advanced Translation 1

The spotted realization is that I attended a fundraiser today, and I'm thinking of donating some money, while at the same time I don't know if I will. I'm viewing the concept that I will research this group by Friday to make sure it's legitimate, and if so, then I commit to making a donation of $100.

Mechanisms of Advanced Translation 1

The spotted realization (M) is that I attended a fundraiser today, and I'm thinking of donating some money, while at the same time (M4) I don't know if I will (M6). I'm viewing the concept (M2) that I will research this group by Friday to make sure it's legitimate, and if so, then I commit (M10) to making a donation of $100.

Advanced Translation 2

A pictured reflection is that I attended a fundraiser today, and I'm thinking of donating some money. I don't know if I will. I'm contemplating the consideration that I will research this group by Friday to make sure it's legitimate, and if so, then I commit to making a donation of $100.

Mechanisms of Advanced Translation 2

A pictured reflection is that I attended a fundraiser today, and I'm thinking of donating some money (M4). I don't know if I will. I'm contemplating the consideration (M2) that I will research this group by Friday to make sure it's legitimate, and if so then I commit (M10) to making a donation of $100.

Original Sentence Sample 4

This is so unfair because you completely ignored what we spoke about yesterday. I am angry and don't want to speak to you until you change your mind.

Basic Translation

My observed thought is that this is so unfair. It is associated with the thought that you completely ignored what we spoke about yesterday. I'm experiencing feelings of anger and observing the thought that I choose not to speak to you until you change your mind.

Mechanisms of Basic Translation

My observed thought is (M2) that this is so unfair. It is associated with (M5) the thought that (M1) you completely ignored what we spoke about yesterday. I'm experiencing feelings (M8) of anger and observing the thought that (M2) I choose (M6) not to speak to you until you change your mind.

Advanced Translation 1

The gist of my observed thought is that this is so unfair. It is related to the knowledge of you totally ignoring what we spoke about yesterday. I'm experiencing the emotion of anger and perceiving the notion that I elect not to speak to you until you change your mind.

Mechanisms of Advanced Translation 1

The gist of my observed thought (M2) is that this is so unfair. It is related to (M5) the knowledge (M1) of you totally ignoring what we spoke about yesterday. I'm experiencing the emotion of anger (M8) and perceiving the notion (M2) that I elect (M6) not to speak to you until you change your mind.

Advanced Translation 2

There's the contemplation of the consideration that this is so unfair. It is linked with the reflection of you totally ignoring what we spoke about yesterday. I am immersed in the emotion of anger, and entertaining the judgment that I opt to no longer speak to you until you change your mind.
Mechanisms of Advanced Translation 2

There's the contemplation of the consideration (M3) that this is so unfair. It is linked (M5) with the reflection (M1) of you totally ignoring what we spoke about yesterday. I am immersed in the emotion of anger (M8), and entertaining the judgment (M2) that I opt (M6) to no longer speak to you until you change your mind.
Software Combined with Conventional Text
(D1, D2 & D3 Mechanism have been Programmed to Occur Every 3$^{rd}$ Sentence on Average. All Other Mechanisms are Programmed at 100%)
David: I love my dog but he barks too much. I get really angry when he does this. Yesterday my landlady told me that if he doesn't stop, I'll have to get rid of him. I try teaching him not to do it, but he just keeps on barking
David: I'm observing the thought that I love my dog. There are feelings of anger in me associated with his doing this. Yesterday my landlady told me that if he doesn't stop I will be getting rid of him. My observed thought is that I teach him not to do it and he just still barks.
Robin: I'm sorry to hear that. Have you tried taking him to obedience school classes?
Robin: I'm sorry to hear that. I'm noticing the idea that you have taken him to obedience school classes?
David: No. I don't think it'll work because he doesn't get along well with other dogs. Plus they're so expensive. I'm frustrated. I don't know what to do.
David: No. The belief I'm experiencing is that it will not work. That's associated with the conviction that he doesn't get along well with other dogs.
Robin: If you can't afford it, maybe you should get some books on dog training and do it yourself.
Robin: If you can't afford it maybe you can get some books on dog training and do it yourself.
David: That's a good idea. Maybe I'll go to the library tomorrow and get something. I hope he listens. It seems pretty hopeless now. I have to get him to stop barking or I'll find myself on the street.
David: That's a good idea. I commit to going to the library tomorrow and getting something. I'm observing the opinion that he will listen. An opinion: It appears hopeless. I choose to get him to stop barking or I'll find myself on the street.
Robin: Sounds like you have a pretty good plan there.
Robin: I'm observing the impression that you have a pretty good plan here.
David: Yea, I hope It'll work.
David: Yea, I'm committed to having it work.

The inventive method, i.e., application program or software enhances personal growth in a variety of areas. When communicating with others, users input text into a computer or smart phone, which is then modified, and likewise receive modified return messages. Ten mechanisms and eighteen or nineteen word/phrase pools monitor the text and modify it under specific criteria.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for processing an original user writing, implemented by a computer processor, to modify relationships between words, phrases, signs and symbols comprising the writing, where necessary, to generate a modified writing that more clearly conveys a semantic content intended by the user, or consistent with the core principles associated with its mechanisms, when compared to the original user writing, comprising the steps of:
receiving an original writing from a user,
processing the original writing on the computer processor;
performing a linguistic analysis on the original user writing using a plurality of grammatical rules to identify semantic content and based on the processing, and the semantic content,
suggesting modified writing based upon said linguistic analysis;
altering the relationships between the words, phrases, signs and symbols within the writing, where necessary, to realize a modified writing reflecting the altered relations.
proving the modified writing to the user with an explanation of said grammatical rules and their relationship to the user's meaning of said modified writing;
identifying semantic content of the modified writing to the user;
generating a map of the user's transcribed speech, including a listing of said identified semantic content used to modify the writing; and,
outputting verbal and/or written instructions to the user to verbally communicate explanations to the user why the semantic changes were made to the user's original writing.

2. The method of processing as set forth in claim 1, wherein the step of altering the relationships includes generating a description highlighting a difference between a connotation of the altered words, phrases, signs and symbols altered before and after alteration.

3. The method of processing as set forth in claim 1, wherein said written and verbal communications enable focused goal-directed action by the user.

4. The method of processing as set forth in claim 1, wherein said written and verbal communications enable user self help communications training.

5. The method of processing as set forth in claim 1, wherein said computer processor is in a personal desktop computer.

6. The method of processing as set forth in claim 1, wherein said computer processor is in a personal laptop computer.

7. The method of processing as set forth in claim 1, wherein said computer processor is in a hand held tablet computer.

8. The method of processing as set forth in claim 1, wherein said computer processor is in a smart phone.

9. The method of processing as set forth in claim 1, wherein said verbal instructions to the user are communicated through a microphone.

10. The method of processing as set forth in claim 1, wherein said verbal instructions to the user are communicated through a transcribed text on a display screen.

11. The method of processing as set forth in claim 1, wherein said written instructions to the user are transcribed to audio output and communicated through a microphone.

12. The method of processing as set forth in claim 1, wherein said written instructions to the user are communicated through a transcribed text on a display screen.

13. The method of processing as set forth in claim 1, wherein said verbal and instructions to the user are communicated in combination both as audio output through a microphone and transcribed as visual text on a display screen.

14. The method of processing as set forth in claim 1, wherein said verbal and instructions to the user are communicated in combination both as audio output through a microphone and transcribed as visual text on a display screen.

\* \* \* \* \*